Nov. 21, 1933.   J. E. LOVELY   1,936,401
MACHINE TOOL WITH WORK FEEDING MECHANISM
Filed June 5, 1931   10 Sheets-Sheet 7
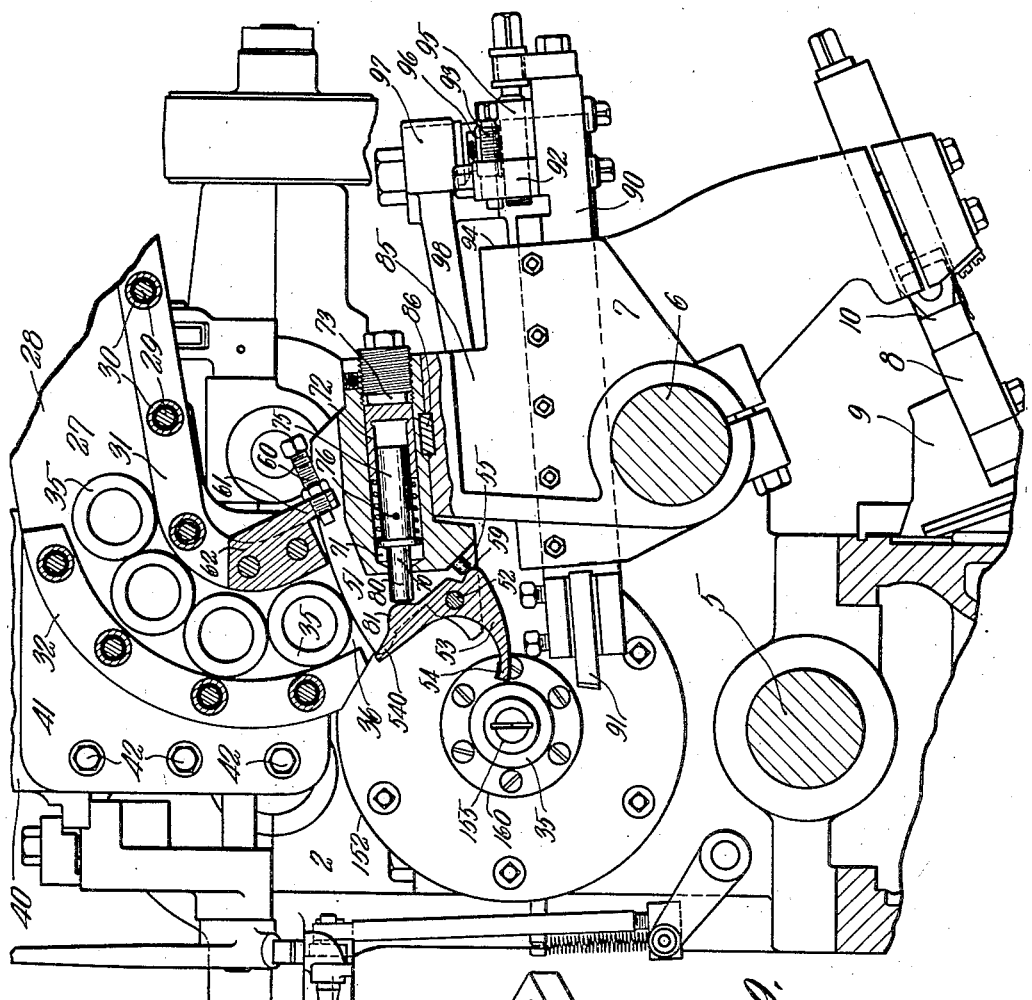
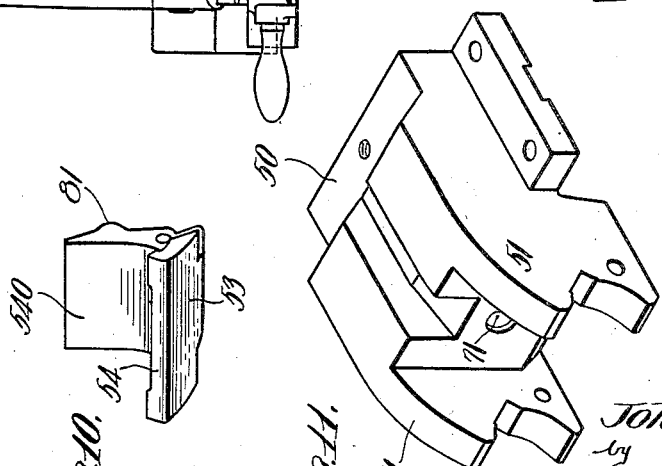
Inventor
John E. Lovely
by
Wright Brown Quinby & May
Attys.

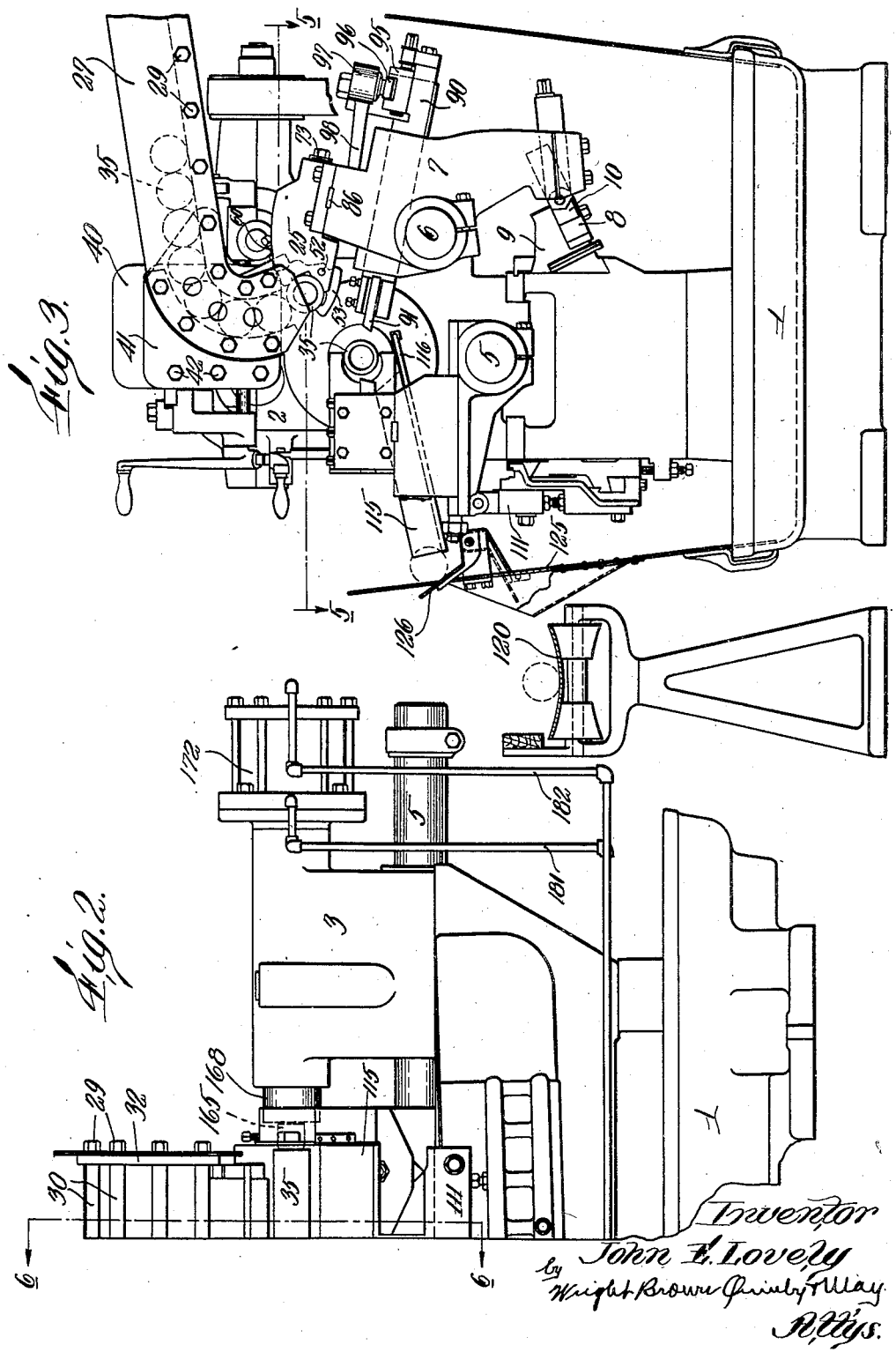

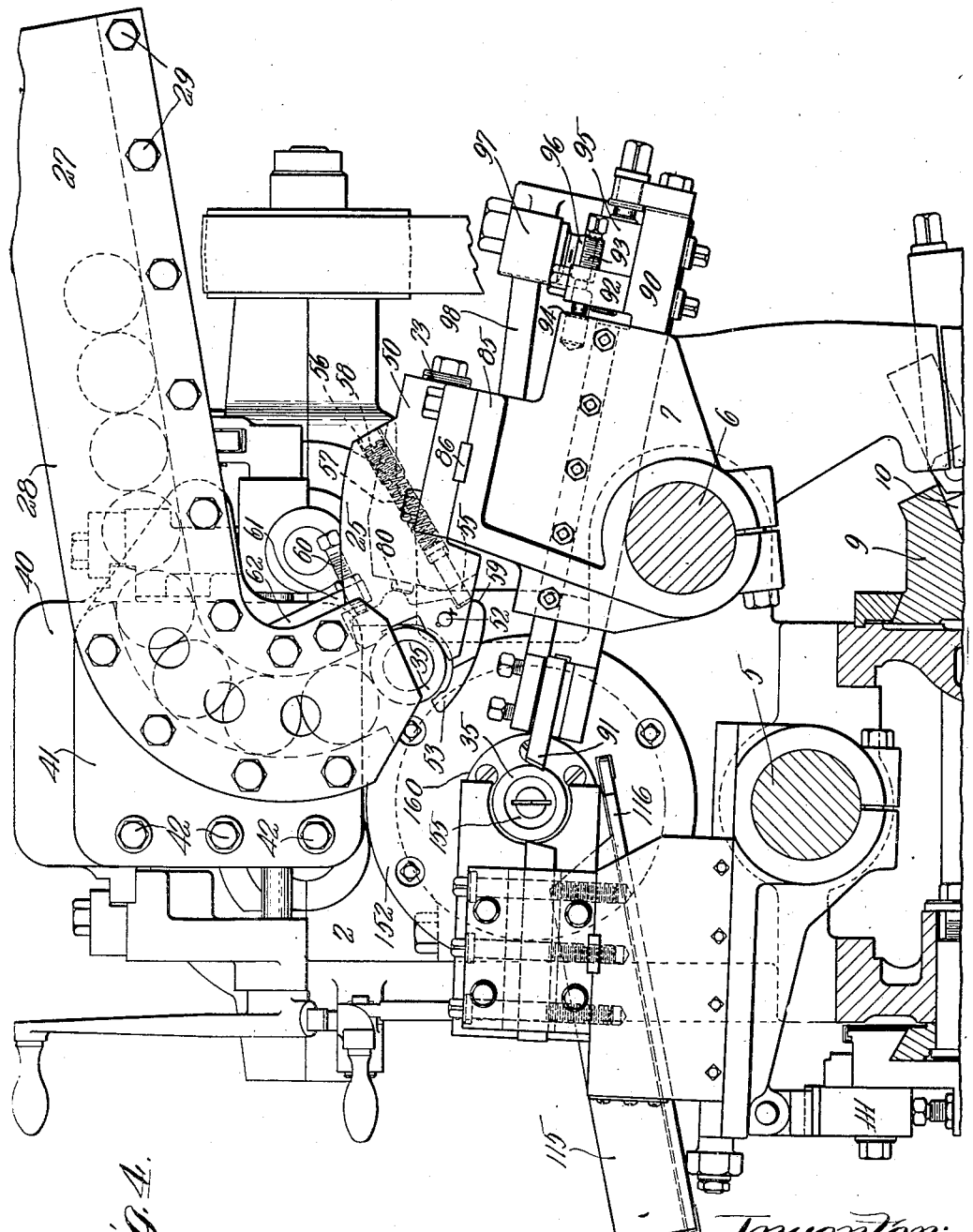

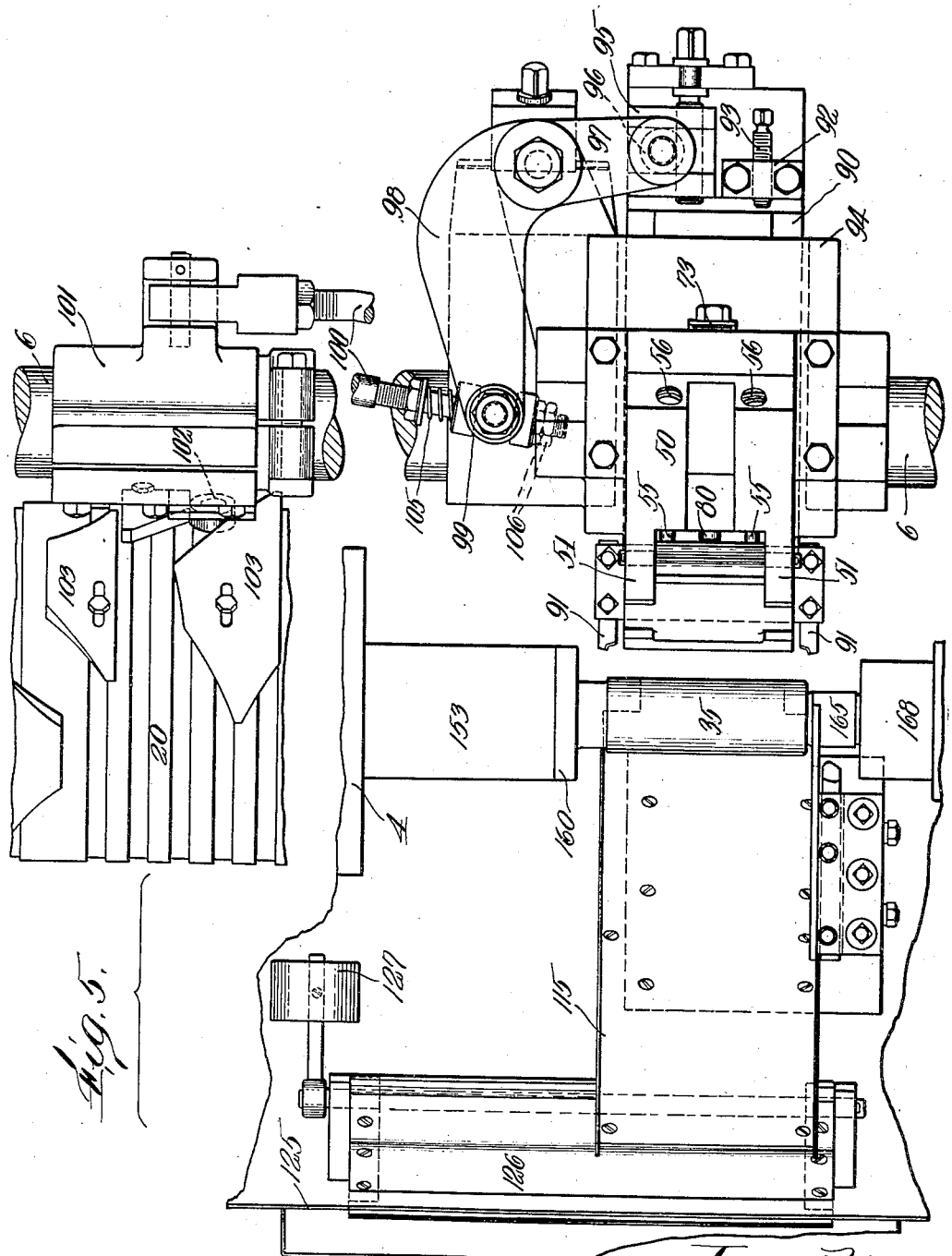

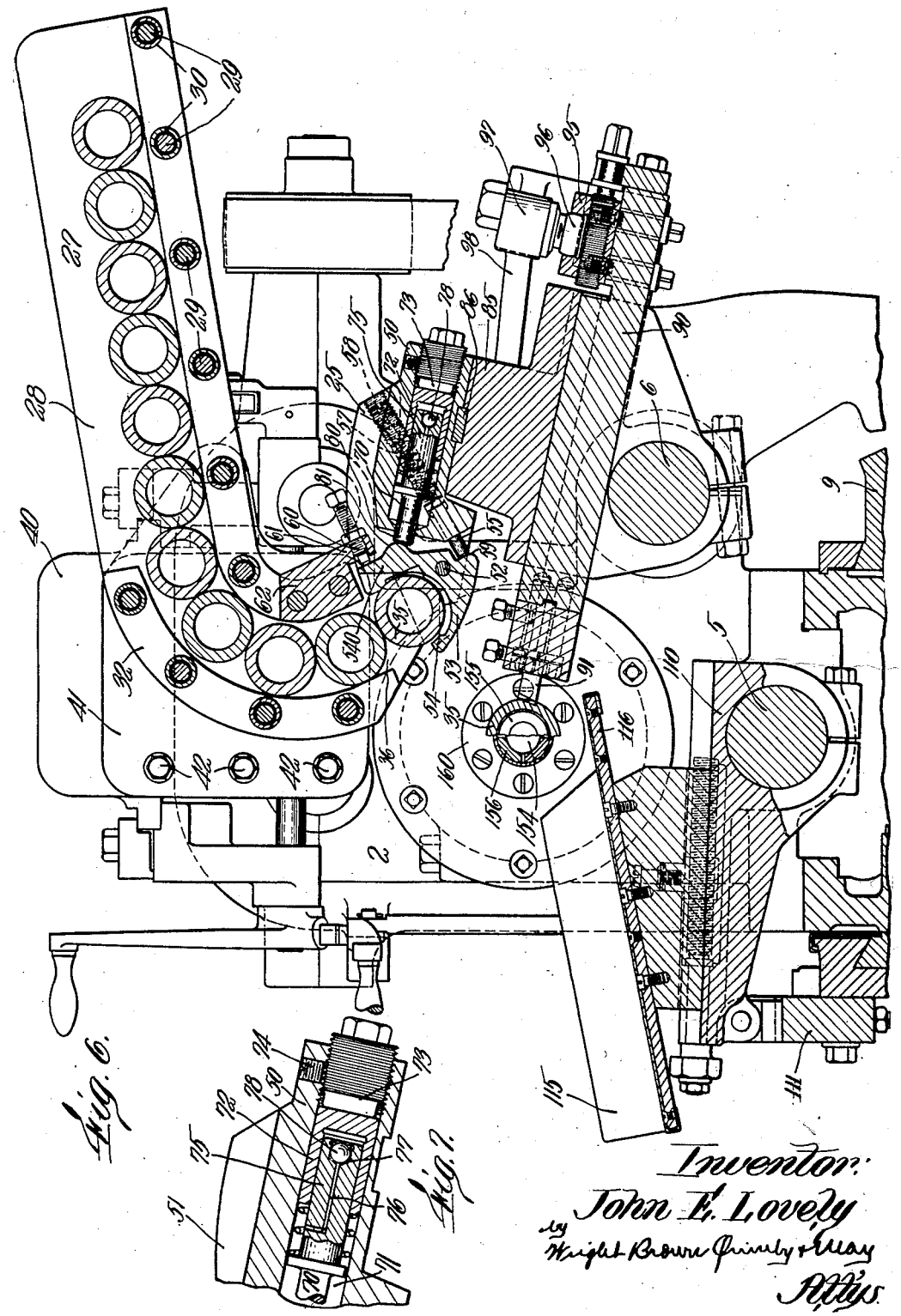

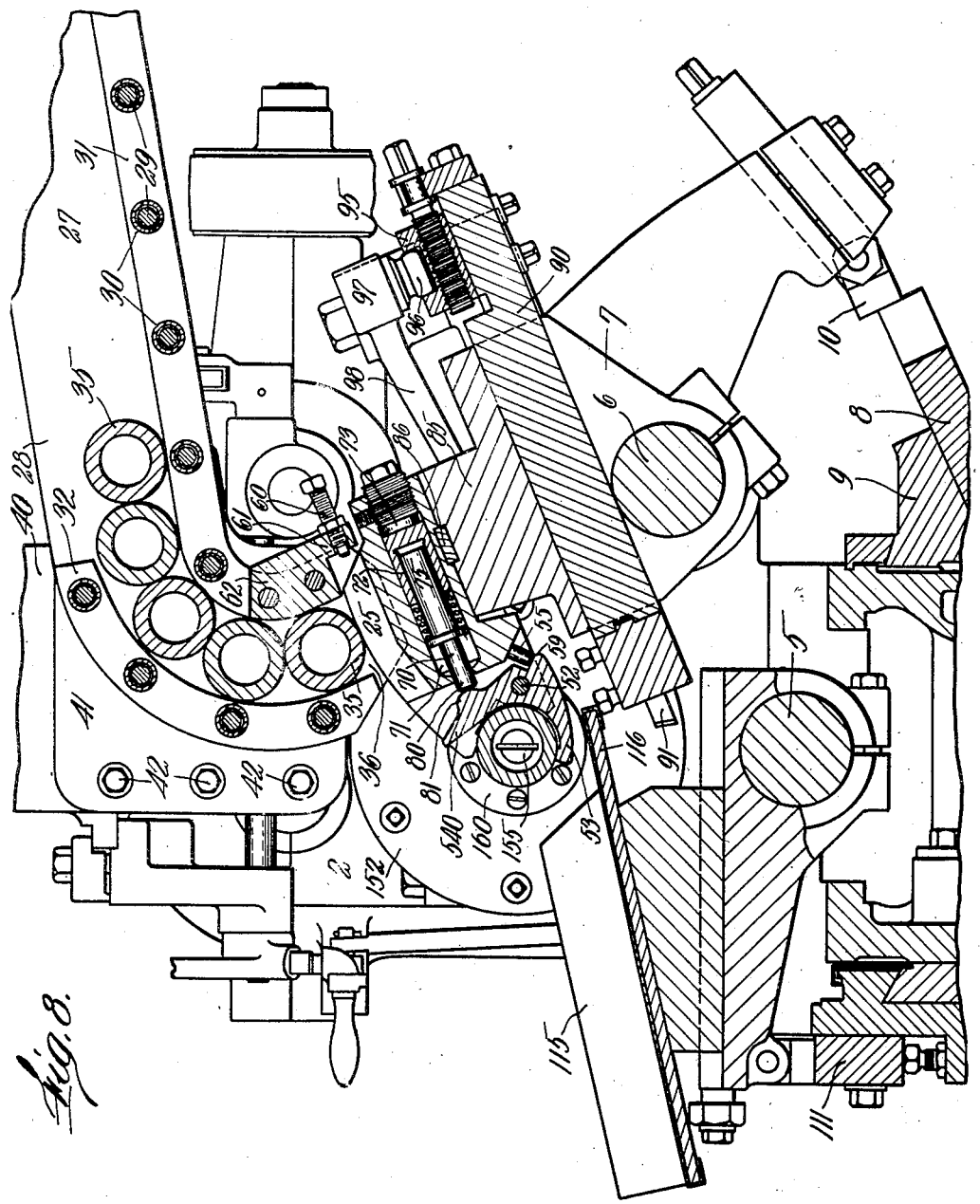

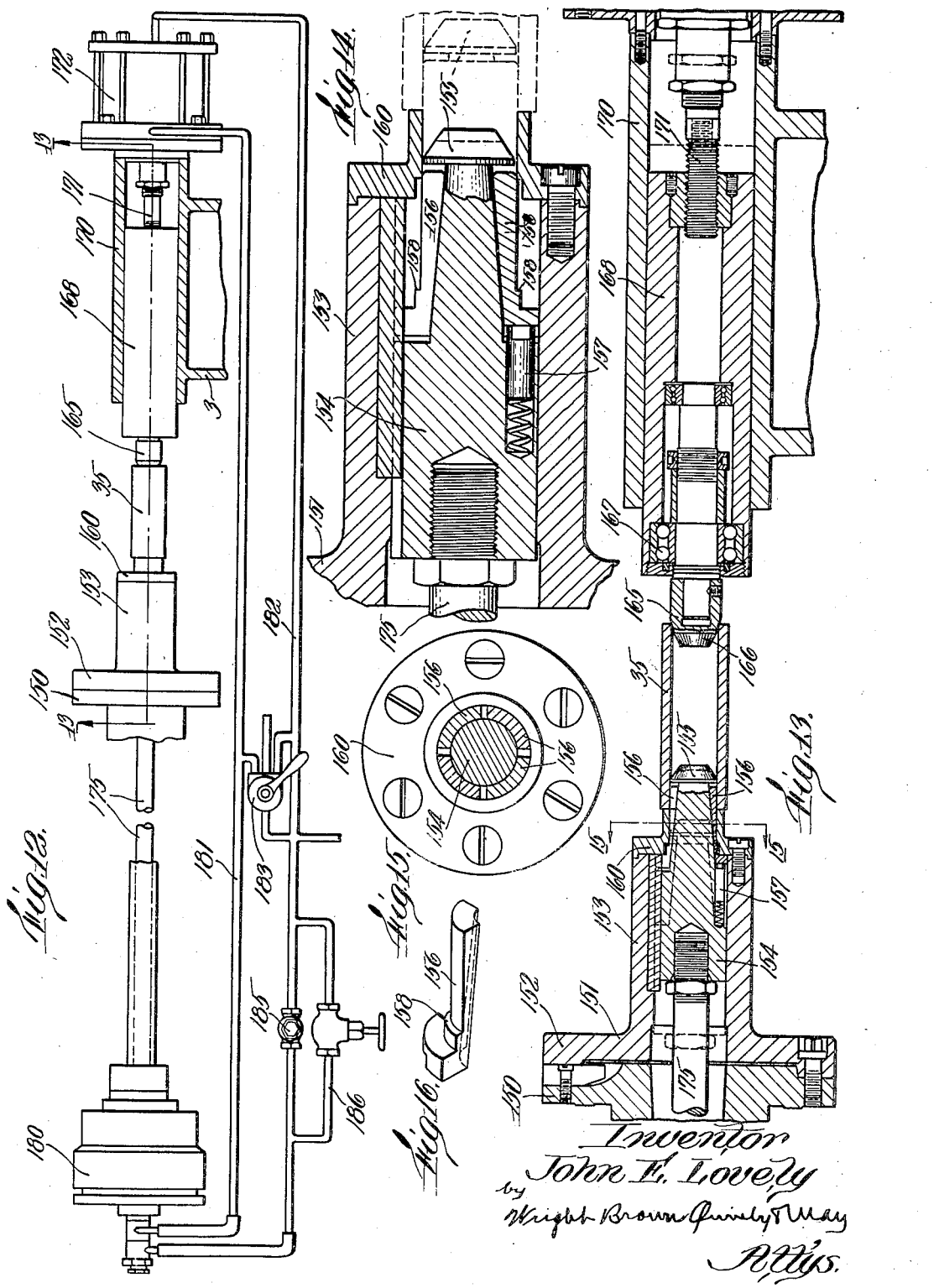

Nov. 21, 1933.    J. E. LOVELY    1,936,401
MACHINE TOOL WITH WORK FEEDING MECHANISM
Filed June 5, 1931    10 Sheets-Sheet 9
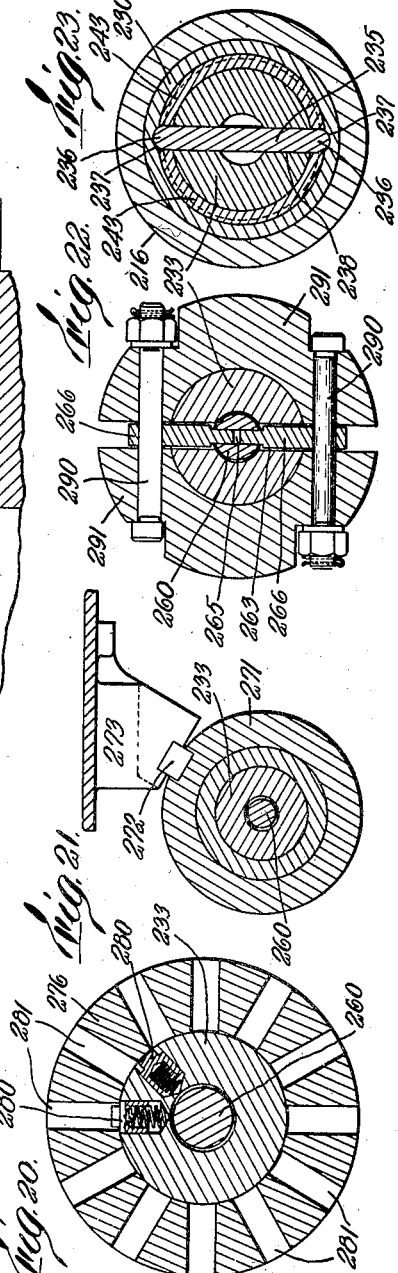
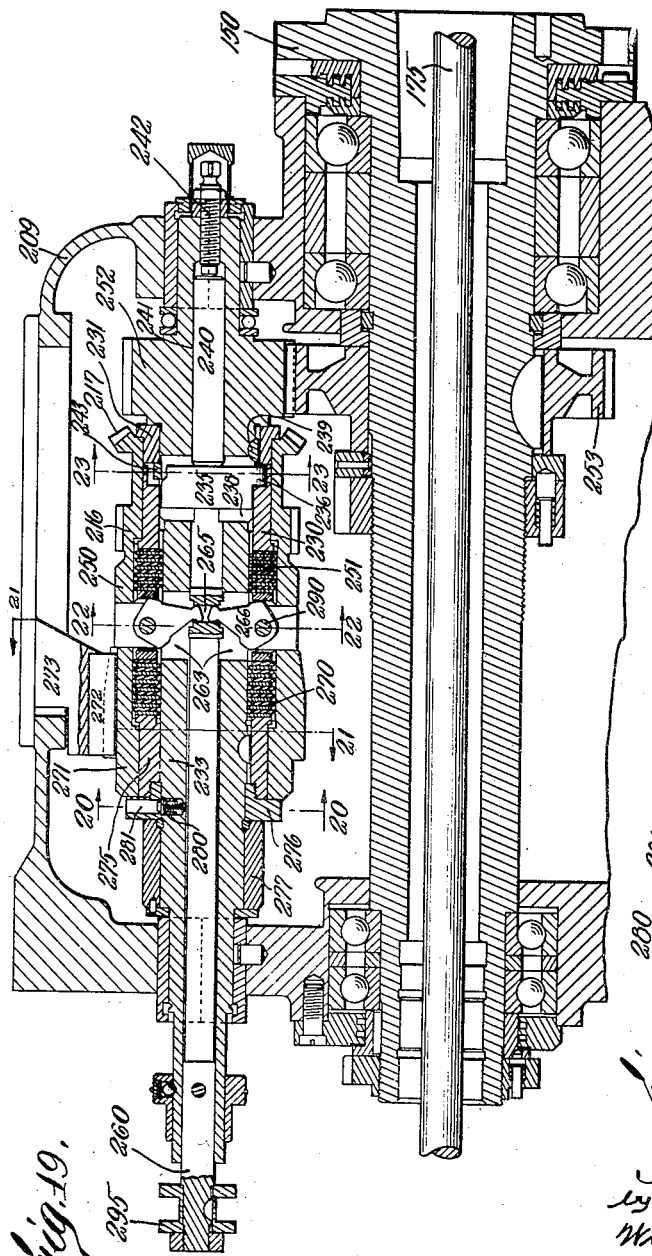
Inventor:
John E. Lovely
by
Wright, Brown, Quinby & May
Attys.

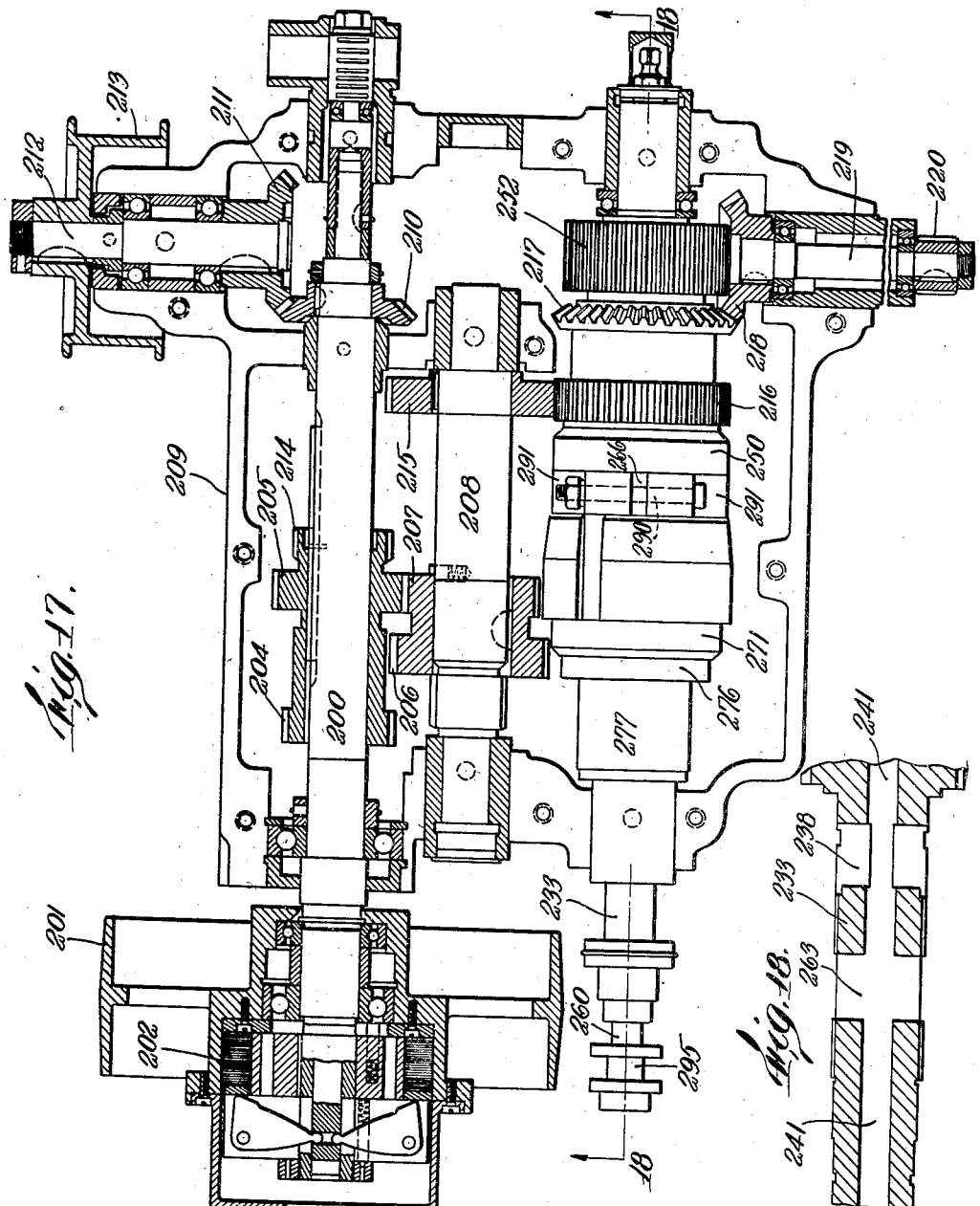

Patented Nov. 21, 1933

1,936,401

UNITED STATES PATENT OFFICE 1,936,401

MACHINE TOOL WITH WORK FEEDING MECHANISM

John E. Lovely, Springfield, Vt., assignor to Jones & Lamson Machine Company, Springfield, Vt., a corporation of Vermont Application June 5, 1931. Serial No. 542,306

18 Claims. (Cl. 82—2)

Where automatic machinery is employed for manufacturing articles in large quantities, it is necessary, in order to derive the full benefits of the automatic action of the machine that the feed of material thereto and the withdrawal of the finished product therefrom be accomplished speedily and properly timed with relation to the cycle of operations of the machine.

The present invention, therefore, has for an object automatic handling of material in connection with an automatic machine tool. To this end mechanism is provided for holding a supply of blanks for the machine and at the proper time in the machine cycle to feed a blank from said holding means into position for the machining operations, holding it, and, if desired, manipulating it, while the operations continue and then releasing the article and removing it so that a succeeding blank from the supply may be properly positioned for the machining operation of a succeeding cycle. More particularly this invention relates to work handling mechanism applicable to lathes of the well known Fay type in which the tools are carried in holders fixed to axially movable and rockable bars arranged substantially parallel to a rotary work spindle, the motions of the bars being produced by cams on a cam drum. In accordance with this invention the various actions of the work handling mechanism are controlled by cams in timed relation to the tool control.

For a more complete understanding of this invention, reference may be had to the accompanying drawings in which Figure 1 is a fragmentary front elevation of a Fay lathe showing a portion of a work handling mechanism embodying this invention.

Figure 2 is a fragmentary front elevation of the same at the opposite end of the machine.

Figure 3 is a right end elevation of the same.

Figure 4 is a view similar to a portion of Figure 3 but to a larger scale and with parts in different positions and with parts in section.

Figure 5 is a plan view with parts above the line 5—5 of Figure 3 being omitted.

Figure 6 is a vertical section on line 6—6 of Figure 2 showing the feed mechanism in retracted position, the back tools being in operation.

Figure 7 is a sectional detail to a larger scale of an element shown in Figure 6.

Figure 8 is a section similar to Figure 6, but showing the feed mechanism in its forward position.

Figure 9 is a fragmentary section similar to Figures 6 and 8 but showing the feed mechanism partly retracted.

Figures 10 and 11 are details in perspective of certain portions of the feed mechanism.

Figure 12 is a diagrammatic view of a fluid pressure-actuated work holder.

Figure 13 is a section to a larger scale on line 13—13 of Figure 12.

Figure 14 is a fragmentary section similar to a portion of Figure 13 but to a larger scale and showing the work centering and clamping plunger retracted.

Figure 15 is a section on line 15—15 of Figure 13 but to a larger scale.

Figure 16 is a detail in perspective of a work clamping element.

Figure 17 is a horizontal section on line 17—17 of Figure 1.

Figure 18 is a fragmentary section through a member of a transmission train which is shown with other parts in Figure 19.

Figure 19 is a vertical section on line 19—19 of Figure 17.

Figures 20 to 23 are detail sections on the correspondingly numbered section lines of Figure 19.

Figure 1:
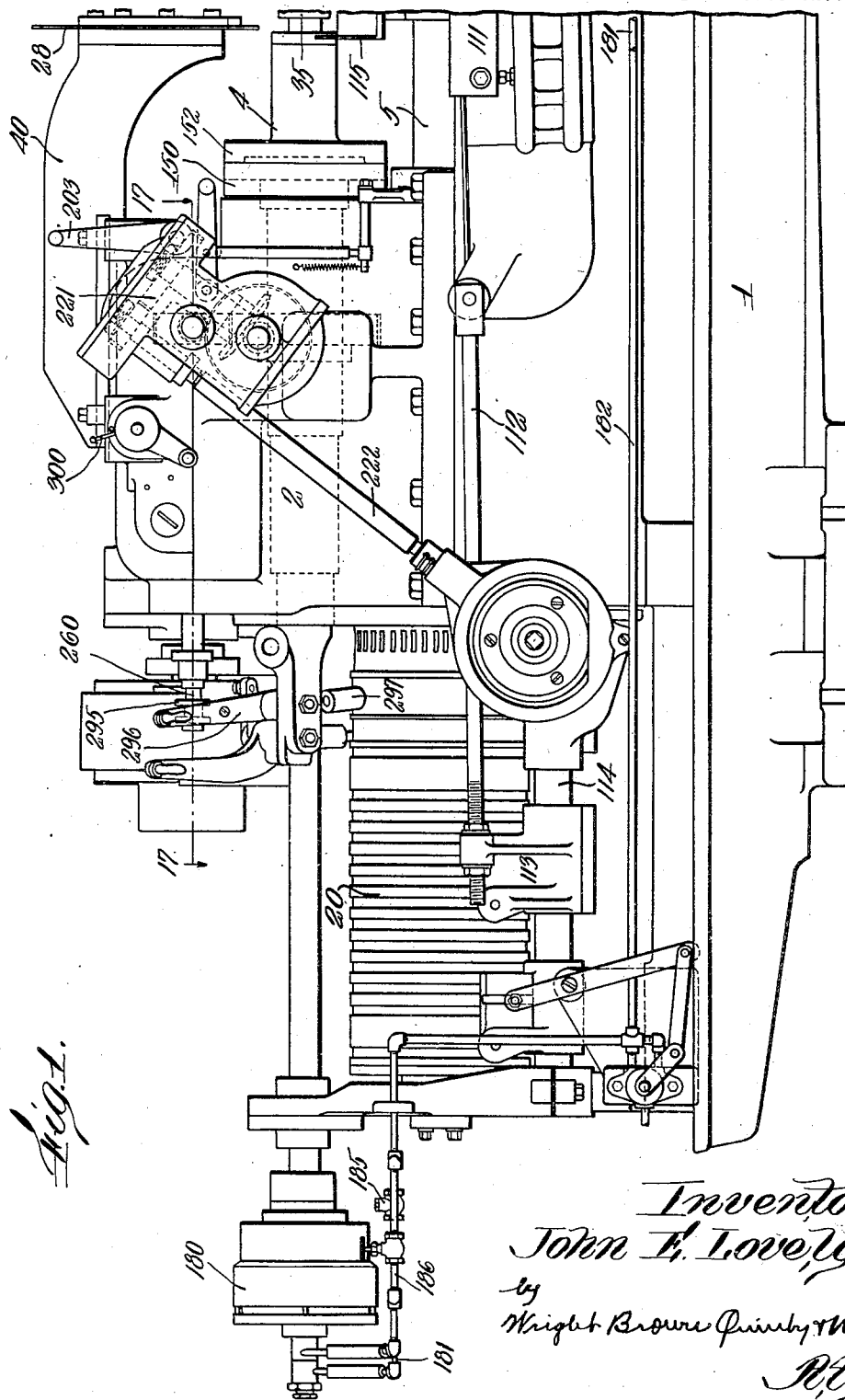

Referring to these drawings, at 1 is indicated the bed of the lathe supporting at one end a headstock 2 and adjacent to the other end, as shown in Figure 2, a tailstock 3. The headstock has mounted therein a work spindle having a work holding device indicated generally at 4. Extending beneath the work spindle is the usual rocking and axially movable tool bar 5 and above the bed 1 and at the back of the machine is the rockable and axially movable tool bar 6, these parts being in the well known arrangement of the Fay lathe. The back tool bar 6 has fixed thereto a carrier 7 and the angular position of this carrier is determined by a former cam 8 mounted to slide lengthwise of the machine on ways 9 in the usual manner, a follower 10 on the carrier 7 resting on the top face of the former cam. The axial position of the former cam and thus the angular position of the carrier 7 is controlled from suitable cams on the cam drum 20 with which machines of this type are provided.

The carrier 7, in accordance with the present invention, is provided with a device 25 for transferring blanks successively from a blank supply hopper 27 to the work spindle by rocking of the carrier. This supply hopper 27 as shown may comprise a pair of spaced side walls 28 fixed together by bolts 29 with spacer collars 30 on these bolts between the walls 28. Where the bolts pass through the walls 28, these walls may be provided with the extensions 31 and 32 which form guide rails, on the lower of which, as 31, the blanks 35 are supported, and the upper of which, as 32, guide the blanks to a discharge opening 36 at the forward and lower end of the hopper. This hopper is rigidly fixed to the machine frame as by means of a bracket arm 40 (see Figure 1) which may have a rearward extension overlying the upper face of the headstock 2 and to the outer end of which the wall 41 of the hopper may be secured as by bolts 42.

The device 25 for transferring the blanks successively from the hopper to the spindle may comprise a block 50 shown detached in Figure 11, having a pair of outwardly extending side walls 51 formed arcuate on their upper faces about the center of the bar 6 as an axis so as to ride beneath the open discharge end of the hopper to retain the blanks therein except in the retracted position of the device at which time the forward edge of the block 50 is positioned rearwardly of the discharge opening of the hopper, as shown best in Figure 6. Between the side wall portions 51 of this block is pivotally mounted on an axis 52 a finger member 53 shown detached in Figure 10, having spaced jaws 54 and 540, which, when the feeding device is the position shown in Figure 6 are so presented as to form a recess in the feeding device into which the lowermost blank of the hopper may pass. This member 53 is normally pressed into position to receive a blank and for this purpose a pair of pins 55 axially slidable in openings 56 in the block 50 are provided, these pins being backed up with springs 57 seated in the openings 56 and retained therein by any suitable means such as threaded plugs 58. The inner ends of the pins 55 engage a shoulder portion 59 below the pivot 52 of the member 53.

When the carrier 7 is rocked rearwardly into the position shown in Figure 6, the jaw portion 540 impinges on an adjustable stop screw 60 mounted in a fixed position and as shown threaded into an extension 61 in a block 62 positioned between the side wall members 28 of the hopper. When the feeding device is moved forwardly by forward rocking of the carrier 7, the lowest blank 35, as it is engaged in the member 53 is rocked downwardly into axial alinement with the work spindle where it is taken by the work holder 4, as will later be described, and the feeding device is then rocked rearwardly to receive the succeeding blank from the hopper. In order that this may be done the jaw member 53 must rock forwardly against the action of the spring pressed pins 55 to release the blank which has been grasped by the spindle work holder. It has been found, however, that to properly operate, the return of the member 53 to its rearward position should be delayed until after the member 53 has fully cleared the blank which has just been delivered. For this purpose a dash pot mechanism has been provided, this comprising a plunger 70 mounted in a socket 71 in the block 50. The rear end of this plunger 70 is formed to slide within a cupped member 72 seated in the socket 71 and held therein by an externally threaded plug 73 engaged in the outer end of the socket 71 and secured in adjusted position as by means of a set screw 74. This portion 75 of the plunger which rides in this cup member 72, is provided with a passage 76 opening out beyond the inner end of the element 72 at one end, and into a ball valve pocket 77 at its inner end. A ball check valve 78 is seated in this pocket and is pressed by air pressure against its seat to close the passage 76 when the plunger is attempted to be driven into the member 72 so that such action is retarded. Outward movement of the plunger may be done freely, however, the ball valve 78 moving away from its seat in this direction of movement of the plunger. The outer end 80 of this plunger engages a rib 81 extending across the rear face of the jaw portion 540. Thus as the jaw member 53 is rocked forwardly to release the blank which has been taken by the work spindle, the plunger 70 follows quickly against the rib 81 but the action of the spring pins 55 in returning the member 53 to its normal position is delayed by the resistance of the dash pot to inward or rearward motion of the plunger 70.

The block 50 is shown as carried on an upstanding post portion 85 of the carrier 7 and to which it is keyed by the transverse key 86. The carrier 7 may also be used as a support for certain of the tools which operate on the work. To this end it is shown as provided with a slot in which is slidably mounted a bar 90 having any suitable means for supporting one or more tools such as 91 at its forward end. Upstanding from the rear end of this bar 90 may be positioned a bracket 92 (see Figure 5) to receive an adjustable stop screw 93 which may impinge on a fixed portion 94 of the carrier 7 to limit the inward movement of the bar 90. The bar 90 is also shown as provided with a block 95 secured to its upper face having a slot within which may ride a roll 96 journaled on the under face of one arm 97 of a bell crank lever 98. The other arm of this lever is connected through a jaw member 99 with a bar 100 which extends to a collar 101 slidably mounted on the headstock end of the tool bar 6, this collar 101 carrying a follower roll 102 against which impinge at suitable times controlling cams 103 carried by the cam drum 20. As shown the member 99 is resiliently supported on the bar 100 for limited lost motion, a spring 105 normally pressing the member 99 into engagement with stop and lock nuts 106 on the forward end of the bar 100. A pull exerted on the rod 100 by the cams on the cam drum will therefore cause the tool bar 90 to be moved inwardly to bring the tools 91 into operative engagement with the work.

The rear tool bar 6 when arranged for this feeding attachment is permitted rocking motion only, being held against axial motion by any suitable means such as is well known in the art. The front tool bar 5 is provided with a tool carrier 110 of any suitable form on which may be carried any desired tools for operating on the blanks, this tool bar being given rocking motion as by the usual front former cam 111 which supports the forward end of the carrier 110, this former cam being moved axially as by the rod 112 (see Figure 1) having one end fixed to a carriage 113 slidable axially of the cam drum 20 as on a guide bar 114, its axial position being determined by suitable cams (not shown) on the drum 20 in the usual manner. This front carrier may also have mounted thereon a chute 115 having its inner end as 116 positioned to receive the work after the machining operation and to permit it to pass therealong to any suitable point such as to a conveyor of any suitable type indicated generally by 120 in Figure 3. The front carrier may also be given axial movement if desired so that the outer face of the blanks may be turned. As shown the guard or splash plate 125 is positioned between the conveyor 120 and the machine and this plate is shown as provided with a door element 126 which is struck by the blanks after they are discharged from the work spindle and as they pass down the chute 115. This door 126 is counterweighted as by a weight 127 (see Figure 5) so that it is automatically opened by the pressure of the work striking it as it passes down the chute 115, this door opening and then closing to discharge the work onto the conveyor 120.
The mechanism for grasping the work for rotation of the work spindle is shown in detail in Figures 12 to 17. This mechanism per se forms the subject matter of my application for Patent Serial No. 464,471, filed June 28, 1930 for Work holding mechanism. The headstock spindle is provided with a nose 150 to which is secured a member 151 having a flange 152 keyed to the spindle nose 150, and a tubular extension 153. Within the tubular extension is slidably keyed a block 154 having its outer end formed as a conical centering head 155 of a size to enter and support one end of the blank 35 and back of this head 155 it is formed tapered to engage a plurality of segmental wedge blocks 156. These wedge blocks are urged toward the rear end of the head 155 as by spring pressed plugs 157 so that their outer circumference may be kept within the outer diameter of the head 155. By moving the block 154 outwardly, however, a shoulder portion 158 of each segmental block engages a mating shoulder on an end plate 160 for the tubular portion 153 so that further outward movement of the block 154 causes radial outward movement of the blocks 156, thus to force them against the inner wall of the blank and hold it centered and in driving relation to the spindle nose 150 of the work spindle. The pins 157 also act as keys to prevent relative rotation between the block 154 and the segmental pieces 156.
At the tailstock end of the machine is positioned a center 165 provided with a conical end 166 which may engage within the bore of the blank 35 and center this end of the blank. This center 165 is supported in suitable ball bearings 167 within a sleeve 168 which is axially movable in the tailstock member 170. This member 168 is fixed by any suitable means to the plunger 171 of a fluid pressure cylinder 172. Likewise the block 154 of the headstock is attached to a rod 175 extended to a fluid pressure mechanism rotatable with the headstock spindle 180. These fluid pressure mechanisms are connected through pipes 181 and 182 with a control valve 183 by which fluid under pressure may be admitted to either end so as to drive the centering mechanism from both the headstock and tailstock ends into or out of engagement with the blank. If desired means may be provided for insuring the entry of the tailstock centering mechanism and the pressure of this tailstock against the end of the plate 160 in centered relation to the head 155 before this head is moved inwardly sufficiently to effect clamping of the blank for rotation. To this end a check valve is shown at 185 in the pipe 182 leading to the headstock mechanism to prevent the flow of fluid under pressure in a direction to force the headstock mechanism into clamping engagement with the work while permitting free exhaust to release the work. This check valve is by-passed by a valved pipe 186, the valve being so adjusted as to give the desired restricted flow of liquid in a direction to effect clamping of the headstock mechanism thus to delay the clamping movement of the headstock mechanism and insure the preliminary clamping of the work against the plate 160 before the work is grasped for rotation with the headstock spindle.

It is desirable that the spindle be stationary when a blank is being applied thereto or released therefrom and in Figures 17 to 23 inclusive portions of the drive mechanism are illustrated by which this stopping of the spindle may be accomplished. Referring to Figure 17, at 200 is indicated a machine drive shaft carrying at one end a belt pulley 201 which may be driven by any suitable source of power, it being usual practice with machines of this type to mount a motor on the top of the headstock. This pulley 201 is journaled for rotation on the end portion of the shaft 200 but may be clutched to drive this shaft as by the multiple disk clutch shown at 202 and which may be controlled in the well known manner of the Fay lathe by a suitable hand lever at 203 and also automatically by suitable cams on the cam drum 20. This shaft 200 has splined thereto the integral driving gears 204, 205 and 214 which may be brought selectively into mesh with the gears 206, 207 or 215 on an intermediate shaft 208, these gears being enclosed within a casing 209. Any suitable means, not herein shown in detail, but provided with a control lever shown at 300 on Figure 1 may be provided for bringing either of the gears 204 or 205 into meshing relation with their mating gears 206 and 207, respectively, in accordance with which the shaft 208 may be driven at either of two selected speeds. The shaft 200 also has connections through the beveled gears 210 and 211 with a transverse shaft 212 which carries a belt pulley 213 at its outer end outside of and at the back of the casing 209. This belt pulley 213 is connected by a suitable belt (not shown) by a high speed drive for the cam drum 20, in accordance with the showing of the Flanders Patent No. 1,219,813 for Metal working machine granted March 20, 1917.

The intermediate shaft 208 has keyed thereto a gear 215 which meshes with a gear 216. This gear 216, as shown best in Figure 19, has integral therewith a bevel gear 217 and this gear 217, as shown best in Figure 17, meshes with a beveled pinion 218 fixed to a shaft 219 in axial alinement with the shaft 212 and extending out through the forward side of the casing 209. This shaft 219 is provided at its outer end outside of the casing with a pinion 220 contained within a housing 221 (see Figure 1) from which an inclined shaft 222 extends to the low speed drive for the cam drum 20. This is as shown in the Flanders Patent No. 1,219,813 except that herein the transmission mechanism includes the inclined shaft 222 in place of the belt connection shown in the Flanders patent. As long as the main shaft 200 is driven, therefore the driving connections to the high and low speed drive mechanisms for the cam drum 20 are in operation and with either of these the cam drum may be coupled as shown in the Flanders patent. The gears 216 and 217 are formed as portions of a sleeve which is loosely journaled partly on a sleeve 230 and partly on a sleeve 231, both of these being carried by a central sleeve 233 shown detached in Figure 18. The sleeve 230 is keyed to the sleeve 233 by a transverse key member 235 (see Figures 19 and 23) which has projecting portions 236 at opposite ends riding in notches 237 in the inner wall of the sleeve 230 and extends through a slot 238 passing diametrically through the sleeve 233. The sleeve 231 is permanently keyed to the sleeve

233 as by the key 239 (see Figure 19). For a purpose which will later appear the key member 235 is adjustable axially in the slot 238 and is backed up by a bar 240 extending through the central bore 241 of the sleeve 233 and engaged by an adjusting bolt 242 threaded into the end of the sleeve 233 and bearing on the outer end of the bar 240. The key member 235 is held in position by means of a pair of arcuate or ring sections 243. The gears 216 and 217 are also integral with a tubular extension 250 which houses a multiple ring clutch 251, alternate rings being fixed to the tubular extension 250 and to the sleeve 233, respectively, so that when this clutch 251 is in clutched relation, rotation of the gear 216 also causes rotation of the sleeve 233. This sleeve has integral therewith a gear 252 which meshes with a gear 253 secured to the work spindle through which the actuating rod 175 for the work clamping mechanism extends. Thus when the sleeve 233 is rotated the spindle is also rotated.

When the clutch 251 is unclutched, however, the gears 216 and 217 rotate without imparting rotation to the work spindle, but it will be noted that through the rotation of the gear 217 the slow motion drive for the cam drum 20 is still being driven and in condition to be coupled thereto when desired. The clutching or unclutching of the clutch 251 as shown is accomplished by axial movement of the rod 260 which extends through the central bore 241 of the sleeve 233 in alinement with the adjusting bar 240. Within a transverse slot 263 in the sleeve 233 the bar 260 is provided with a transverse slot 265 within which ride the inner ends of the clutch actuating dogs 266 so that when the rod 260 is moved to the right into the position shown in Figure 19, the clutch 251 is closed. By moving the rod 260 outwardly or to the left, as shown in Figure 19, the dogs 266 are rocked to release the clutch 251 but at the same time they are rocked to clutch a second multiple ring clutch 270. The clutch has alternate rings keyed to the sleeve 233 and to the inner face of a sleeve 271 which surrounds the sleeve 233. The sleeve 271 is held against rotation by means of a key 272 engaging in opposed grooves in the sleeve 271 and in a fixed bracket 273 carried by the casing 209. (See Figures 19 and 21.)

Means for adjusting the clutch 270 to take up wear may be provided, this being shown as consisting of a sleeve 275 extending within the sleeve 271 and bearing on the left hand end of the series of friction rings forming the clutch 270 and having threaded connection with a collar 276. This collar 276 is held in fixed axial position by means of an abutment sleeve 277 and it may be rotated angularly and locked in any selected of a plurality of angular positions. This locking means comprises a pair of plugs 280 shown best in Figure 20 seated in sockets of the sleeve 233 and spring pressed outwardly so as to latch into any of a series of radially disposed perforations 281 in the ring 276. By inserting a tool into the proper perforation 281, the plug 280 which engages therein may be pressed out of engagement and the ring rotated until the other plug 280 springs into engagement in another of the perforations 281. The clutch 251 is adjusted by adjusting the key 235 as hereinbefore described, thus engaging and moving the sleeve 230.

The clutch dogs 266, as shown best in Figure 22, are pivoted on bolts 290 which are also employed to fix in proper relation a pair of segmental carrying members 291 through which the sleeve 233 passes.

The rod 260 is shown as provided with a spool shaped member 295 at its outer end with which is engaged a follower (not shown) on an actuating lever 296 shown in Figure 1. This lever carries at its lower end a cam follower 297 in position to be actuated by suitable cams carried by the drum 20. The cams are so arranged on the drum 20 that as the work clamping mechanism is about to be actuated to release a piece of work which has been machined, the rotation of the work shaft is stopped and the cam drum is placed in slow speed. This permits sufficient time for the actuation of the fluid pressure means for releasing the work, whereupon the cam drum is returned to fast speed and the feed mechanism is actuated to feed a blank from the supply to the spindle. The cam drum is then again placed in slow speed and the blank gripping mechanism is actuated to grip the work, whereupon the feed mechanism is retracted, the cam drum may again be placed in high speed, and the rotation of the work spindle is resumed.

From the foregoing description of one embodiment of this invention, it should be evident to those skilled in the art that various changes and modifications might be made without departing from the spirit or scope of this invention as defined by the appended claims.

I claim:

1. The combination with a rotary work spindle, a rockable bar arranged substantially parallel to said spindle, and a carrier fixed to said bar, of a blank holder, a member carried by said carrier and actuable by the rocking thereof to take blanks successively from said holder and present them to said spindle, means for holding a blank so presented to said spindle and for releasing the same, a tool bar movable on said carrier for supporting a tool for operating on a blank held by said spindle, and cam means for controlling the movements of said tool bar and said holder with relation to said carrier.

2. The combination with a rotary work spindle, a rockable bar arranged substantially parallel to said spindle, and a carrier fixed to said bar, of a blank holder, a member carried by said carrier and actuable by the rocking thereof to take blanks successively from said holder and present them to said spindle, means for holding a blank so presented to said spindle and for releasing the same, a tool bar movable on said carrier for supporting a tool for operating on a blank held by said spindle and cam means for controlling the movements of said tool bar and said holder with relation to said carrier and said blank holding and releasing means.

3. The combination with a rotary work spindle, a rockable bar arranged substantially parallel to said spindle, and a carrier fixed to said bar, of a blank holder, a member carried by said carrier and actuable by the rocking thereof to take blanks successively from said holder and present them to said spindle, means for holding a blank so presented to said spindle and for releasing the same, a tool bar movable on said carrier for supporting a tool for operating on a blank held by said spindle, a former cam supporting said carrier and determining its angular position, and cam means for controlling said former cam, the movements of said tool bar, and said blank holding and releasing means.

4. The combination with a rotary work spindle, a rockable and axially movable bar arranged substantially parallel to said spindle, and a carrier fixed to said bar, of a blank holder, a member on said carrier actuable by the rocking thereof to take blanks successively from said holder and present them to said spindle, a former cam for supporting said carrier, a tool slide on said carrier, a tool on said slide for operating on the blank held on said spindle, a cam drum, and cams on said drum for controlling said former cams and said tool slide.

5. In combination, a rotary work spindle, means for clamping to and releasing work from said spindle, a blank supply support, and conveyor mechanism for transferring blanks one by one from said support to said spindle, said mechanism having a portion formed to receive a blank and a pivoted finger for holding a blank to said portion, spring means for yieldingly holding said finger in blank holding position yieldable to permit withdrawal of a blank clamped on said spindle on return of said portion toward said support, and means for delaying return of said finger toward blank-holding position from blank-withdrawing position.

6. The combination with a rotary spindle, a pair of rockable bars arranged substantially parallel to said spindle, and carriers fixed to said bars, of a stationary blank holder, means on one of said carriers actuated by the rocking thereof to transfer blanks successively from said holder to said spindle, means for holding a blank so delivered to said spindle and for then releasing said blank, a chute on the other of said carriers for receiving blanks released from said spindle, a tool on one of said carriers for operating on a blank held by said spindle, and means for rocking said carrier and bars.

7. The combination with a rotary spindle, a pair of rockable bars arranged substantially parallel to said spindle, and carriers fixed to said bars, of a stationary blank holder, means on one of said carriers actuated by the rocking thereof to transfer blanks successively from said holder to said spindle, means for holding a blank so delivered to said spindle and for then releasing said blank, a chute on the other of said carriers for receiving blanks released from said spindle, said other carrier being movable axially of the work, a tool on said other carrier for operating on a blank held by said spindle, and means for controlling the motions of said carriers.

8. The combination with a rotary spindle, a pair of rockable bars arranged substantially parallel to said spindle, and carriers fixed to said bars, of a stationary blank holder, means on one of said carriers actuated by the rocking thereof to transfer blanks successively from said holder to said spindle, means for holding a blank so delivered to said spindle and for then releasing said blank, a chute on the other of said carriers for receiving blanks released from said spindle, said other carrier being movable axially of the work, a tool on said other carrier for operating on a blank held by said spindle, and means for controlling the motions of said carriers and said blank holding and releasing means.

9. The combination with a rotary spindle, a pair of rockable bars arranged substantially parallel to said spindle, one of said bars being also axially movable, a carrier fixed to each bar, a chute on said rockable and axially movable carrier to receive work released from said spindle, a tool on said chute supporting carriers for traversing the work carried by said spindle, a blank holder, means supported on the other of said carriers for feeding blanks successively from said holder to said spindle on rocking of said other carrier, a tool supported on said other carrier, means for holding a blank to said spindle and for releasing it therefrom, and means for controlling said holding and releasing means and the motions of said carriers.

10. In combination with a spindle, a chute for receiving work from said spindle, a guard plate extending above the lower end of said chute, said plate having an opening therethrough to permit the passage of work delivered by said chute, and a door normally closing said opening yieldable to permit the passage of such work.

11. The combination with a rotary spindle, carriers movable toward and from said spindle, means on one of said carriers for presenting blanks to said spindle to be rotated thereby, means on the other of said carriers for receiving blanks released from said spindle, tools supported by said carriers for operating on a blank while carried by said spindle, and means for controlling the positions of said carriers and tools.

12. The combination with a rotary spindle, a pair of rockable bars arranged substantially parallel to said spindle, and carriers fixed to said bars, of a stationary blank holder, means on one of said carriers actuated by the rocking thereof to transfer blanks successively from said holder to said spindle, means for holding the blanks on said spindle and for releasing said blanks, a chute on the other of said carriers for receiving blanks released from said spindle, said other carrier being movable axially of the work, a tool on said other carrier for operating on a blank held by said spindle, a tool support movably mounted on said one carrier in position to be operative on a blank held by said spindle when said transfer means is retracted from said spindle, means for controlling the motions of said carrier, and means for controlling said tool support.

13. In combination, a work spindle, a movable carrier, means on said carrier for presenting work to said spindle to be rotated therewith and to retract from said spindle on movement of said carrier, a tool bar movably carried by said carrier, means for moving said carrier, and means for moving said tool bar relative to said carrier to control the position of a tool thereon with relation to work rotatable with said spindle.

14. The combination with a rotary work spindle, a rockable bar arranged substantially parallel to said spindle, and a carrier fixed to said bar, of a blank holder, a member carried by said carrier and actuable by the rocking thereof to take blanks successively from said holder and present them to said spindle, means for holding a blank so presented to said spindle and for releasing the same, a tool for operating on the blank while so held, a tool bar movable on said carrier for supporting a tool for operating on a blank held by said spindle, and cam means for controlling the movements of said tool bar, said first mentioned tool and said holder with relation to said carrier.

15. The combination with a rotary work spindle, a rockable bar arranged substantially parallel to said spindle, and a carrier fixed to said bar, of a blank holder, a member carried by said carrier and actuable by the rocking thereof to take blanks successively from said holder and present them to said spindle, means for holding a blank so presented to said spindle and for releasing the same, a tool for operating on the blank while so held, a tool bar movable on said carrier for supporting a tool for operating on a blank held by said spindle, and cam means for controlling the movements of said first mentioned tool and said tool bar and said holder with relation to said carrier and said blank holding and releasing means.

16. The combination with a rotary work spindle, a rockable bar arranged substantially parallel to said spindle, and a carrier fixed to said bar, of a blank holder, a member carried by said carrier and actuable by the rocking thereof to take blanks successively from said holder and present them to said spindle, means for holding a blank so presented to said spindle and for releasing the same, a tool for operating on the blank while so held, a tool bar movable on said carrier for supporting a tool for operating on a blank held by said spindle, a former cam supporting said carrier and determining its angular position, and cam means for controlling said former cam, said first mentioned tool, the movements of said tool bar, and said blank holding and releasing means.

17. In combination, a work spindle, a movable carrier, means on said carrier and actuated by motions thereof to present work to said spindle and to retract therefrom, a tool bar for supporting a tool for operation on work carried by said spindle, said tool bar being movably supported on said carrier and partaking of its work presenting and retractive motions, and means for moving said carrier and said tool bar relative to said carrier.

18. In combination, a work spindle, a pivoted carrier, means on said carrier and actuated by pivotal motions thereof to present work to said spindle and to retract therefrom, a tool bar slidably carried by said carrier and carrying a tool for operating on work on said spindle, and means for moving said carrier and said bar relative thereto.

JOHN E. LOVELY.